United States Patent
Roberts et al.

(10) Patent No.: US 6,816,487 B1
(45) Date of Patent: Nov. 9, 2004

(54) MAPPING OF HIGH BANDWIDTH CONNECTIONS IN A MULTI-STAGE SWITCH

(75) Inventors: Kim B. Roberts, Nepean (CA); Andrew Sciascia, London (GB); Hamid R. Mehrvar, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 164 days.

(21) Appl. No.: 09/620,486

(22) Filed: Jul. 20, 2000

(51) Int. Cl.$^7$ .............................. H04J 3/16; H04Q 11/00
(52) U.S. Cl. ..................... 370/388; 370/358; 370/360; 370/380
(58) Field of Search .............................. 370/357, 358, 370/360, 380, 381, 386, 388, 355, 373, 352, 468, 400, 351, 230

(56) References Cited

U.S. PATENT DOCUMENTS

| | | | | |
|---|---|---|---|---|
| 5,329,520 A | * | 7/1994 | Richardson | 370/225 |
| 5,345,441 A | * | 9/1994 | Paker et al. | 370/358 |
| 5,408,231 A | * | 4/1995 | Bowdon | 340/2.22 |
| 5,754,120 A | * | 5/1998 | Argentati | 340/2.22 |
| 5,987,027 A | | 11/1999 | Park | |
| 6,157,643 A | * | 12/2000 | Ma | 370/389 |
| 6,754,208 B2 | * | 6/2004 | Kam et al. | 370/388 |

OTHER PUBLICATIONS

"Analysis of Call Packing and Rearrangement in Multi Stage Switch", by Youngsong Mun et al., IEEE Transactions on Communications, vol. 42, No. 2/3/4, Feb./Mar./Apr. 1994.

"Datapath implementation: bit–slice structure versus standard cells", by R. Leveugle et al., Institut National Polytechnique de Grenoble, IEEE 1992.

"VLSI Design Methodologies for Application Specific Binary Sensors", by M.T. Rigby et al., University of Brighton, United Kingdom, pp. 166–170.

Design and Operation of a Quantum Flux Parametron Bit–Slide ALU, by Willy Hioe et al., IEE Transactions on Applied Superconductivity, vol. 5, No. 2, Jun. 1995.

"Bit–Slide Design: Controllers and ALUs", Advanced Micro Devices, Inc., published 1981.

* cited by examiner

*Primary Examiner*—Seema S. Rao
*Assistant Examiner*—Robert C Scheibel (57) ABSTRACT

A high bandwidth connection is mapped through a multi-stage switch between an ingress node and an egress node via a center stage comprising M (an integer) center stage nodes. Each center stage node is connected to the ingress and egress nodes by respective links adapted to support m (an integer) respective connections. An m×M connection matrix of connections between the ingress node and the center stage is provided. Each column of the connection matrix contains $1 \leq j \leq m$ connections between the ingress node and a respective one of the center stage nodes, and each row of the connection matrix contains $1 \leq k \leq M$ connections between the ingress node and the center stage nodes. The high bandwidth connection is mapped through the multi-stage switch by layering the high bandwidth connection within the connection matrix. Thus the high bandwidth connection is divided into N segments. Each segment is mapped to a respective one of a block of N available connections within the connection matrix so that a sum of all connections between and ingress and an egress node is substantially evenly distributed across the center stage nodes of the Clos network.

28 Claims, 6 Drawing Sheets

MAPPING OF HIGH BANDWIDTH CONNECTIONS IN A MULTI-STAGE SWITCH

CROSS-REFERENCE TO RELATED APPLICATIONS

This is the first application filed for the present invention.

MICROFICHE APPENDIX

Not applicable.

TECHNICAL FIELD

The present invention relates to multi-stage switches, and in particular to a method and apparatus for mapping high bandwidth connections through a multi-stage switch.

BACKGROUND OF THE INVENTION

Synchronous Optical Network (SONET)/Synchronous Digital Hierarchy (SDH) protocol is widely used for physical-layer data transport. SDH is the European equivalent of the SONET standard. A reference in this document to SONET is therefore intended to refer to SDH as well as SONET. Under the SONET protocol, signals are forwarded section-by-section across a network along an end-to-end connection (i.e. a SONET path), which is established (nailed up) prior to a communications session, and which remains nailed-up for at least the duration of the session.

As is well known in the art, it is highly desirable to successfully complete every request for a path through a telecommunications network. A path that cannot be completed successfully, for example because a connection between sections of the path cannot be found, is said to be "blocked". It is also well known that a plurality of switch nodes can be interconnected in a multi-stage architecture to provide a Clos network. Application Specific Integrated Circuits (ASICs) can also be interconnected in a Clos network pattern within a SONET switch to provide a versatile switching node.

It is also known that a Clos network may be designed to be non-blocking by providing sufficient hardware resources. For example, a three-stage Clos-type network can be made non-blocking by providing a sufficiently large number of nodes in the center stage. In particular, a three-stage Clos network supporting P input connections into the ingress stage, and M connections through the center stage, can be made completely non-blocking by providing that $M \geq 2P-1$. However, as the required number of input connections increases, the number of connections through the center stage required for a non-blocking network (and the associated cost) becomes prohibitive. Accordingly, various techniques have been employed to reduce the probability of blocking in a switch that is of a manageable size. The primary techniques include "packing" and "re-ordering".

"Packing" refers to a technique of mapping connections through a switch (between an ingress node and an egress node) in which the system attempts to map each new connection through the most heavily utilized center stage node. If that attempt fails (due to inadequate idle capacity in the selected center stage node), then successive attempts are made to map the new connection through progressively less utilized center stage nodes, until either a center stage node with sufficient idle capacity is found, or it is determined that the new connection cannot be mapped through the network (in which case the connection is "blocked"). This technique has proven satisfactory for low-bandwidth connections (i.e. having an STS-1 granularity, for example). However, the probability of blocking increases rapidly as the connection bandwidth increases.

Re-ordering refers to a method of mapping connections through a switch network in which, if a new connection is initially blocked (e.g. following a packing algorithm described above), it may nevertheless still be mapped through the network if previously-mapped connections can be rearranged. An example of this method is provided in U.S. Pat. No. 5,987,027, which issued to Park et al. on Nov. 16, 1999. Re-ordering connections can reduce the probability of blocking of new connections, even in cases where the granularity exceeds STS-1. However, a significant amount of system overhead is required to re-order existing connections without interrupting associated communications sessions. As a result, the time required to map new connections increases dramatically as each successive connection is mapped through the switch network.

An alternative method of mapping connections through a switch network is referred to as "bit-slicing", in which a signal is divided into a number of fixed-size units that are evenly distributed across the center stage. Every center stage node handles its respective unit in an identical manner to map the signal to the egress node, and thus a connection map of each center stage node of the switch network is identical. This arrangement tends to simplify the control signaling within the switch network, but dramatically reduces the routing flexibility. Additionally, because the number of units must be equal to the number of center stage nodes (or an integer multiple thereof), the size of each unit must necessarily vary with the signal bandwidth. For example, a switch network having 12 center stage nodes can map an STS-12 signal by slicing that signal into 12 units, each of which having an STS-1 granularity. An STS-48 signal can also be mapped by slicing into 12 units, but in this case each unit must have an STS-4 granularity. Since modern networks commonly carry signal traffic having varying bandwidths, the ingress stage must have some means of controlling the slicing of incoming signals to produce and route units of the appropriate size. This requirement greatly increases the complexity and cost of the switch network.

Accordingly, a method and apparatus that enables connections for high bandwidth signals to be rapidly mapped through a Clos network, with a low probability of blocking and high utilization efficiency of network resources, remains highly desirable.

SUMMARY OF THE INVENTION

An object of the present invention is to provide a method an apparatus for mapping high bandwidth connections through a Clos network or a Clos-type versatile switch.

Accordingly, an aspect of the present invention provides method of mapping a connection for a high bandwidth signal through a Clos network between an ingress node and an egress node via a center stage comprising a plurality of center stage nodes. A number of units in the high bandwidth signal is determined. Each of the units has an equal predetermined size. A number of available connections through the Clos network equal to the number of units is then located. Finally, each unit is mapped to a respective one of the available connections across a center stage node to the egress node of the Clos network mapping each unit to a respective one of the identified available connections, so that the units are generally unequally distributed across each center stage node, but a sum of all signals switched through the Clos network from the ingress node to the egress node at any given time is substantially equally distributed across the center stage nodes of the Clos network.

A further aspect of the present invention provides a Clos network adapted to map a connection for a high bandwidth signal between an ingress node and an egress node via a center stage having a plurality of center stage nodes. The Clos network comprises: means for determining a number of units of the high bandwidth signal, each of the units having an equal predetermined size; locating means adapted to locate a number of available connections through the Clos network equal to the number of units; and, means for mapping each unit to a respective one of the identified available connections, wherein the units are unequally distributed across the center stage nodes, but a sum of all signals switched through the Clos network from said ingress to said egress at any one time is substantially equally distributed across the center stage nodes of the Clos network.

In embodiments-of the invention, the high bandwidth signal is a SONET/SDH signal. The SONET/SDH signal is an STS-N signal comprising N STS-1 frames, and the number of units of the high bandwidth signal corresponds with the number of frames of the STS-N signal. The value of N may be two or more.

The Clos network may be represented by a matrix of connections between the ingress node and the center stage. Each column of the matrix represents a link between the ingress node and a respective center stage node. Each row of the matrix represents connections between the ingress node and each of the center stage nodes. The available connections may be located by successively selecting each connection within a row of the connection matrix. An availability of each selected connection is then determined, and a count of available connections incremented when a selected connection is determined to be available. The count is reset to zero when the selected connection is determined to be unavailable. These steps are repeated until a first predetermined termination condition is satisfied.

The connection matrix is preferably a representation of connections through the Clos-network, that is used to facilitate mapping of signals. The relationship between connections represented in the connection matrix and physical I/O connections within the Clos-network may be arbitrary.

A connection may be determined to be available if a unit of another high bandwidth signal has not previously been mapped to the connection; and the connection can be mapped through a respective center stage node to the egress node. Otherwise, the connection is determined to be unavailable.

A location of a first, available connection may be stored when the count of available connections is incremented to a value of one.

The first predetermined termination condition may comprise any one of: the accumulated count of available connections is equal to the number of units; and a last connection within a row is selected and the accumulated count of available connections is less than the number of units.

When a last connection within a row is selected and the accumulated count of available connections is less than the number of units, a determination may be made concerning whether the matrix contains a next successive row. If a next successive row exists, the process of locating available connections can continue within the successive row. Alternatively, if a next successive row does not exist, a blocking condition of the high bandwidth signal may be reported.

Each unit of the high bandwidth signal may be mapped across the Clos network by mapping each successive unit of the high bandwidth signal to a respective one of the located available connections. Each respective connection, to which a unit has been mapped, is then mapped through a respective center stage node to the egress node.

An advantage of the present invention is that high bandwidth signal paths can be rapidly mapped through the multi-stage switch with high efficiency of utilization of the switch capacity, and low probability of blocking.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method of routing high bandwidth connections through a Clos network by dividing a high bandwidth signal associated with the connection into units of predetermined length, and distributing the units across available connections through the network so that each unit is mapped to a respective one of the available connections across a center stage node to an egress node of the Clos network, so that the units are unequally distributed across each center stage node, but a sum of all signals switched through the Clos network from the ingress to the egress at any given time is substantially equally distributed across the center stage nodes of the Clos network. This method is referred to as connection "layering".

Figure 1:
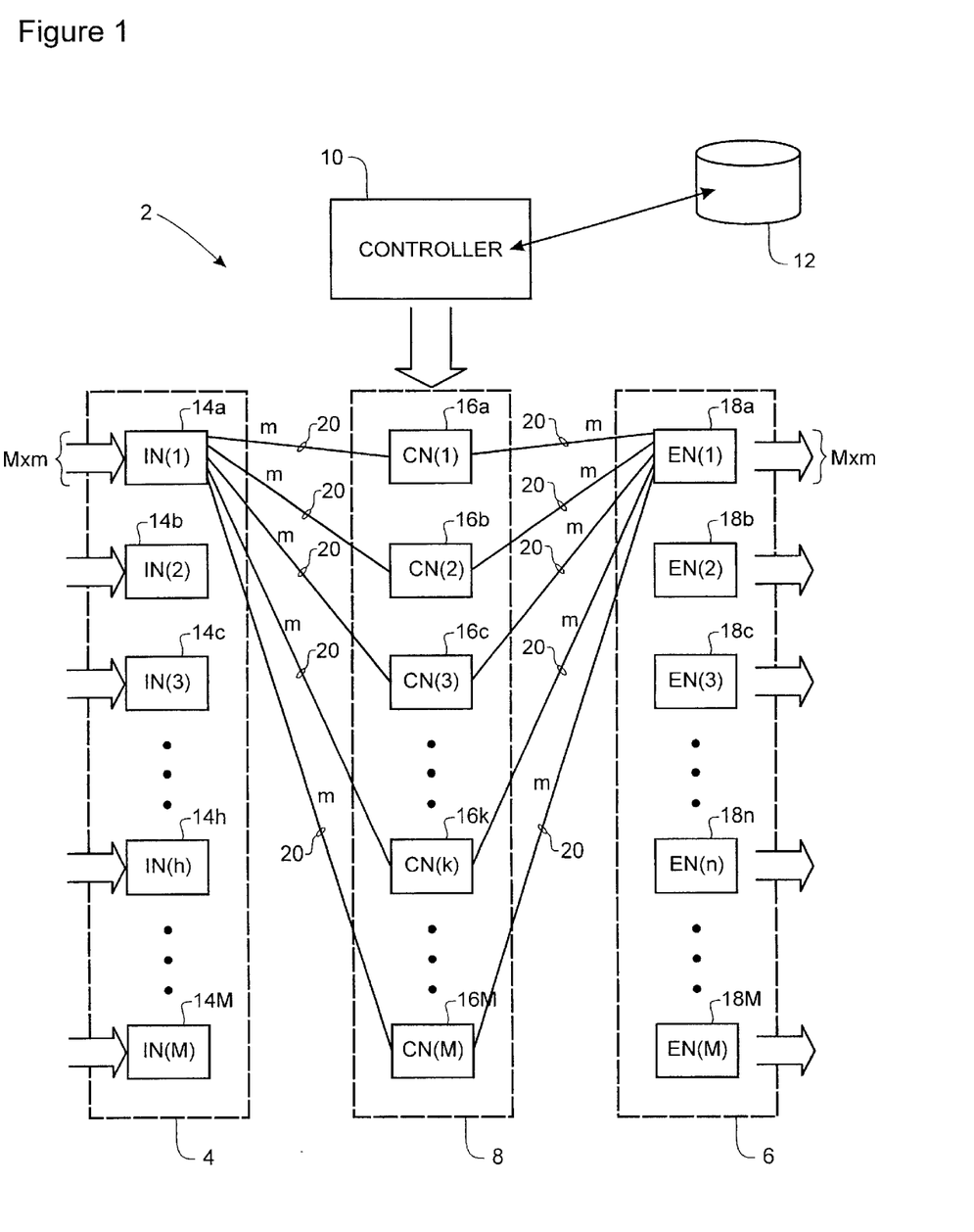
FIG. 1 is a block diagram schematically illustrating a Clos network in respect of which the present invention may be employed.

As shown in FIG. 1, a Clos network 2 generally comprises an ingress stage 4 for receiving ingress data signals; an egress stage 6 for transmitting egress data signals; and one or more center stages 8 between the ingress stage 4 and the egress stage 6 to facilitate mapping of connections through the Clos network 2. The mapping of connections through the network 2 is accomplished by means of a controller unit 10, which may utilize a connectivity database 12 for storing information respecting existing connections and available capacity within the network. As shown in FIG. 1, each stage of the network 2 comprises a plurality of parallel nodes 14,16,18, each of which may be provided as an Application Specific Integrated Circuit (ASIC)), adapted to route signals between a plurality of input and output ports (not shown) in a manner known in the art. As is also known in the art, each of the nodes 14,16,18 are non-blocking within themselves. In general, the number of nodes 14,16,18 within each stage 4,6,8 of the network 2 is arbitrary. Similarly, the number of center stages 8 is also arbitrary. However, for primarily economic reasons it is generally preferable to use a single center stage 8 as shown in FIG. 1.

The Clos network 2 shown in FIG. 1 is a balanced three stage network, in which the number of nodes 14,16,18 in each stage 4,6,8 is equal to M, and each of the stages are fully interconnected by input/output (I/O) connections 20. Thus, each node 14 of the ingress stage 4 is coupled to every center stage node 16 by a respective set of m I/O connections 20. Similarly, each center stage node 16 is coupled to every node 18 of the egress stage 6 by a respective set of m (I/O) connections 20. The numbers (m) of I/O connections 20 linking any two nodes is arbitrary.

In FIG. 1, I/O connections between one ingress node 14a and one egress node 18a via the center stage 8 are illustrated. Similar I/O connections exist between each of the other nodes 14b–14m of the ingress stage 4 and each node 16 of the center stage 8, and between the center stage 8 and each one of the nodes 18 of the egress stage 6. However, for the sake of clarity of illustration, these other I/O connections are omitted from FIG. 1.

Figure 2:
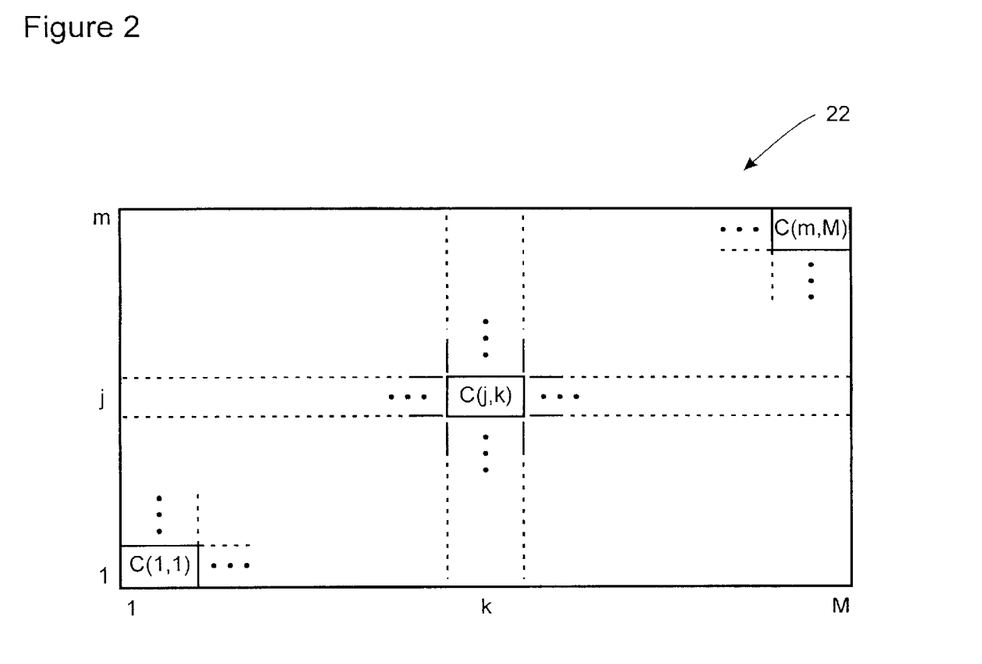
FIG. 2 illustrates an exemplary connection matrix of the Clos network of FIG. 1.

The set of I/O connections 20 between the ingress node 14a and the center stage 8 can conveniently be represented by an mXM matrix 22 in which the set of I/O connections 20 between the ingress node 14a and a respective one of the center stage nodes 16 is represented by a column k of the connection matrix 22, and each one of them I/O connections 20 are represented by corresponding rows j of the connection matrix 22. An exemplary connection matrix 22 is illustrated in FIG. 2. In general, for any high bandwidth connection being mapped through the Clos network 2, selection of an appropriate egress node 18a is dictated by routing of the connection in a conventional manner, which will not be described in further detail. It will be appreciated that the connection matrix 22 is a representation that can conveniently be used to facilitate referencing and identification of individual I/O connections 20, signal mapping, and other control functions within the Clos-network 2. However, the relationship between the connections C(j,k) represented in the connection matrix 22 and the physical I/O connections 20 within the Clos-network 2 may be arbitrary.

The high bandwidth connection is routed through the Clos network 2 by connection layering in order to reduce the probability of connection blocking. In general, "layering" involves splitting a signal into two or more units, and then mapping each unit to respective ones of a block of I/O connections 20 within the connection matrix 22. In a simple example, the block of I/O connections 20 lies within a single row j of the connection matrix 22. However, as will be described in greater detail below, the block of I/O connections 20 may also wrap from one row j to one or more successive rows j+1,j+2, etc. In the illustrated embodiment, each I/O connection 20 of the connection matrix 22 has a granularity of 1, so that one unit of a signal is conveyed through the connection during a signal period. For example, in the case of a high bandwidth SONET/SDH STS-48 connection (which carries a signal comprising 48 concatenated STS-1 frames) the STS-48 signal can be split into 48 units (each unit being an STS-1 frame, and each unit is mapped to a respective I/O connection 20 within a block of 48 I/O connections arrayed in one or more rows of the connection matrix 22. Under the SONET/SDH protocol, the signal period is 125 $\mu$Sec, and the I/O connection granularity of 1 means that each STS-1 frame of the signal is conveyed through a respective I/O connection during this 125 $\mu$Sec signal period. The process of identifying a block of I/O connections 20 within the connection matrix 22, and mapping units of a high bandwidth signal to respective I/O connections 20 is described below by means of example with reference to FIGS. 3 and 4a–c.

Figure 3:
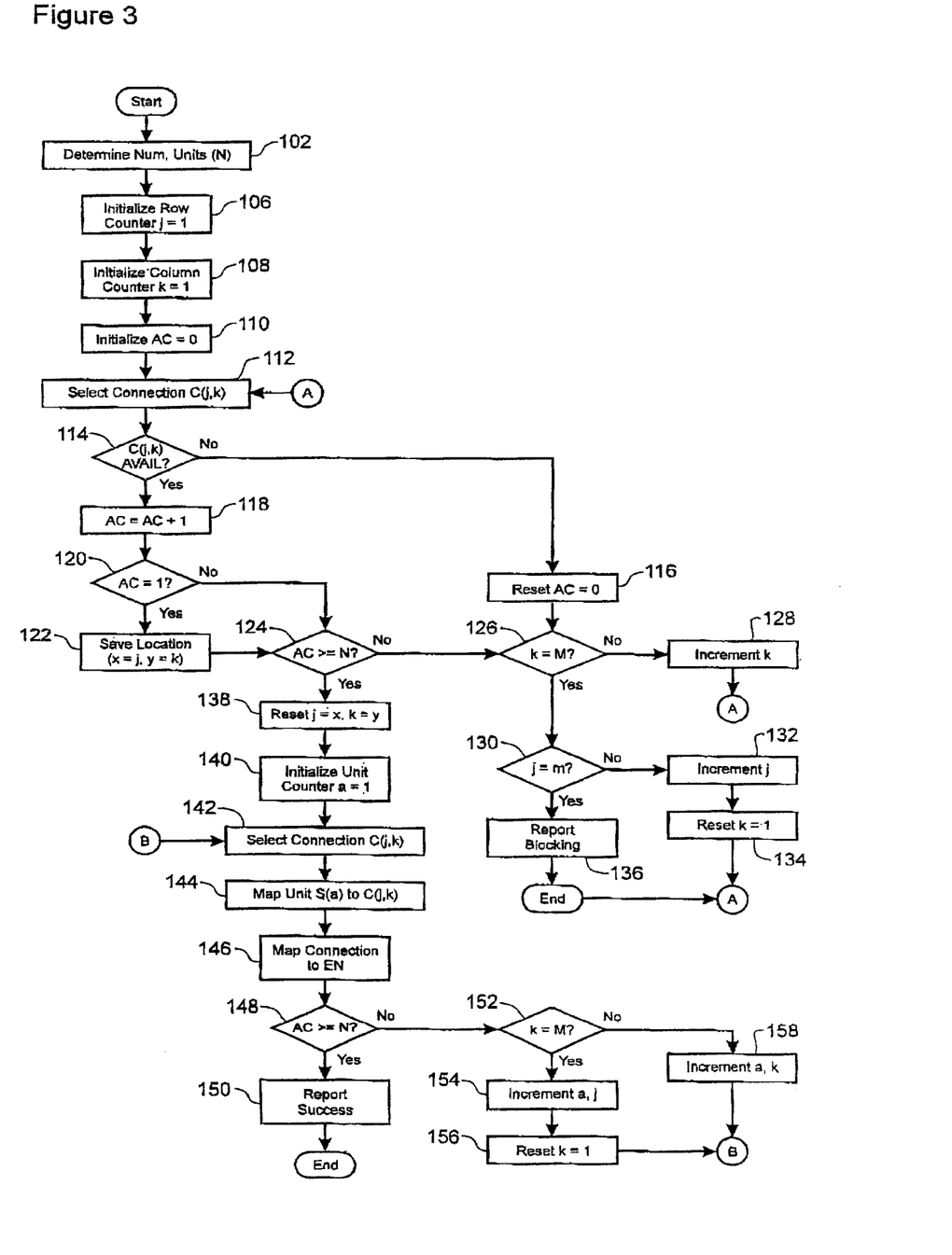
FIG. 3 is a flow-chart illustrating principal steps in an exemplary method of layering high bandwidth signals in accordance with the present invention.

In this example, the center stage 8 includes 96 center stage nodes 16 and 48 I/O connections 20, linking each of the nodes in the Clos network 2. Thus the mXM connection matrix 22 comprises m=48 rows of M=96 columns. For the purposes of the present example, three SONET/SDH connections are to be mapped, in succession, across the Clos network 2 between the ingress node 14h and an egress node 18n. It will be appreciated that the ingress node 14h and the egress node EN 18n are determined, in advance, by means of, for example, routing algorithms well known in the art. The first SONET connection to be mapped carries an STS-48 signal. The second SONET connection to be mapped carries an STS-96 signal. In order to simplify the present discussion, the connection matrix 22 is assumed to be empty (i.e. no other connections have previously been mapped to the connection matrix 22). FIG. 3 shows principal steps in an exemplary process of layering the SONET connections within the connection matrix 22 in accordance with an embodiment of the present invention.

As an initial matter, it will be appreciated that the present example is intended to illustrate overall system behaviours in order to facilitate explanation and understanding of the invention. In actual implementations of the invention, the layering algorithm may well differ from that shown in FIG. 3. For example, selection of a center-stage node 16k through which a signal unit may be mapped can be based on a cost metric such as, for example:

$$\text{minimize}\left[\frac{U(h)}{X(h,k)} + \frac{V(k)}{X(h,k)} + \frac{V(k)}{Y(k,n)} + \frac{W(j)}{Y(k,n)}\right]$$

Where:

X(h,k) is the number of available I/O connections between the ingress node 14h and a center stage node 16k;

Y(k,n) is the number of available I/O connections 20 between the center stage node 16k and the egress stage node 18n;

$U(h)=\Sigma_{k=1}^{M}X(h,k)$ $V(k)=\Sigma_{h=1}^{M}X(h,k)=\Sigma_{n=1}^{M}Y(k,n)$ and $W(j)=\Sigma_{k=1}^{M}Y(k,n)$ Using a cost metric of this type, connections C(j,k) can be selected and checked for availability in a linear order or randomly. In the present example, a linear order is used.

As shown in FIG. 3, layering of high bandwidth connections begins with determining the number of units N in the high bandwidth signal (step 102). Generally, the number of units N may be determined by provisioning. In the case of the first SONET connection to be mapped, N=48. In order to facilitate incremental searching through the connection matrix 22, row and column counters j and k are initialized (e.g. to j=1 and k=1) at steps 106 and 108. A counter for accumulating a number of identified available connections (AC) is also initialized (e.g. to a value of zero) at step 110. A first I/O connection 20 C(j,k) (in this case C(1,1)), is then selected (step 112) and checked to determine its availability status (step 114).

The availability status of any I/O connection 20 C(j,k) determines whether a signal unit can be mapped to that I/O connection 20 C(j,k). At a minimum, this may be determined by whether a unit of another SONET connection has previously been mapped to that I/O connection C(j,k). However, as will be described in greater detail below, the availability status may be further determined by whether the connection C(j,k) can be mapped from the center stage to the identified egress node EN 18a.

If the I/O connection C(j,k) is determined to be unavailable in step 114, the value of the available connections counter AC is reset to zero (step 116) before incrementing the row or column counters j and k, as described in greater detail below.

As explained above, other SONET connections have not been mapped to the connection matrix 22, so the selected I/O connection C(j,k) will be determined to be in an available state at step 114. The available connections counter AC is therefore incremented (to a value of 1) at step 118 and, because this is the first-found available connection (step 120), the (j,k) coordinates of the I/O connection are saved (e.g. x=j, y=k) for future reference at step 122.

The value of AC is then compared to the number of signal units N at step 124. At this time in this example, AC(=1) is less than N(=48), the row and column counters j and k are incremented, as required, to enable the successive connection to be selected and checked for availability. Thus a determination is made (at step 126) of whether the selected I/O connection C(j,k) is in the last column of the row (i.e. k=M). If not, the column counter k is incremented (to a value of 2) at step 128 and the algorithm loops back to step 112 in which a second I/O connection C(j,k) is selected.

If it is determined that k=M in step 126, j is compared to m to determined whether the currently selected I/O connection C(j,k) is the last row (j=m) of the connection matrix 22 (step 130). If j is not equal to m, the row counter j is incremented by 1 (step 132) and the column counter k is reset to 1 (step 134), so that the next selected I/O connection 20 is in column 1 of the next successive row. The algorithm then returns to step 112, for selection of the next I/O connection, C(j,k). If it is determined at step 130 that j equal m, the selected I/O connection C(j,k) is located at j=m,k=M (that is, at the last I/O connection in the connection matrix 22). Since the value of the available connections counter AC is also less than N (determined at step 124) then it is confirmed that the high bandwidth connection cannot be established. Accordingly, a blocking condition is reported at step 136, and the layering algorithm terminates.

Steps 112 through 136 are repeated for each successive I/O connection C(1,1), C(1,2), C(1,3), ... C(1,48), with each I/O connection 20 being determined to be available (step 114), and the available connections counter (AC) being incremented (step 118). The value of AC is compared to the number of signal units N (step 124) until it is determined that AC=N.

When it is determined that AC equals N (step 124), a contiguous block of available I/O connections 20 for layering the entire STS-48 signal has been identified, starting at the first identified available connection C(x,y) (the coordinates of which were previously stored in step 122) and continuing to the currently selected connection C(j,k). Accordingly, the STS-48 signal is sliced into 48 units, which are its 48 constituent frames. The 48 units are then mapped to the 48 I/O connections 20 starting at C(x,y). The flow chart of FIG. 3 illustrates one method by which layering may be accomplished.

In general, layering of the SONET signal in the connection matrix 22 involves mapping successive signal units of the connection to respective ones of the identified block of available I/O connections C(j,k), starting at I/O connection C(x,y). As shown in FIG. 3, this can be accomplished by setting the row and frame counters j,k to x and y at step 138, and initializing a signal unit counter (a) (e.g. to a value of 1) at step 140 before selecting the first available I/O connection C(j=x,k=y) at step 142. A signal unit S(a) identified by the signal unit counter (a) is then mapped (step 144) to the selected I/O connection C(j,k), and this I/O connection C(j,k) is then mapped through the corresponding center stage node 16k to the selected egress node 18n (step 146). As will be understood by those skilled in the art, mapping from the center stage node 16b to the egress node 18a can be accomplished using a separate connection matrix (not shown) in which the I/O connections 20 between the center stage node 16k and the egress node 18n are represented by one column of m rows, for example. When the value of the signal unit counter equals the number of signal units (a=N), (step 148), the last signal unit of the high bandwidth signal has been mapped to the connection matrix 22. Successful mapping of the SONET connection is then reported (step 150), and the mapping algorithm terminates.

The algorithm illustrated in FIG. 3 also supports wrapping of the available connections across rows of the connection matrix, as will be described below in greater detail. Accordingly, prior to incrementing the value of the signal unit counter (a) and selecting the next I/O connection 20, it is necessary to determine whether the previously mapped signal unit S(a) was mapped into the last column k=M of a row. Thus, the value of k is compared to M (step 152). If k=M, then both the value of the signal unit counter (a) and the row counter j are incremented by 1 (step 154), and the value of the column counter k is reset to a value of 1 (at step 156) so that the next unit of the signal will be mapped into column k=1 of the next successive row of the connection matrix 22. Otherwise, the values of the signal unit counter (a) and the column counter k are incremented at step 158 (while the value of the row counter j is unchanged) so that the next signal unit is mapped to the next I/O connection 20 within the same row. Steps 142 through 158 are repeated to map each successive signal unit to successive I/O connections 20 within the connection matrix 22, and to map each of these I/O connections through their respective center stage nodes 16 to the selected egress node EN 18a.

Figure 4A:
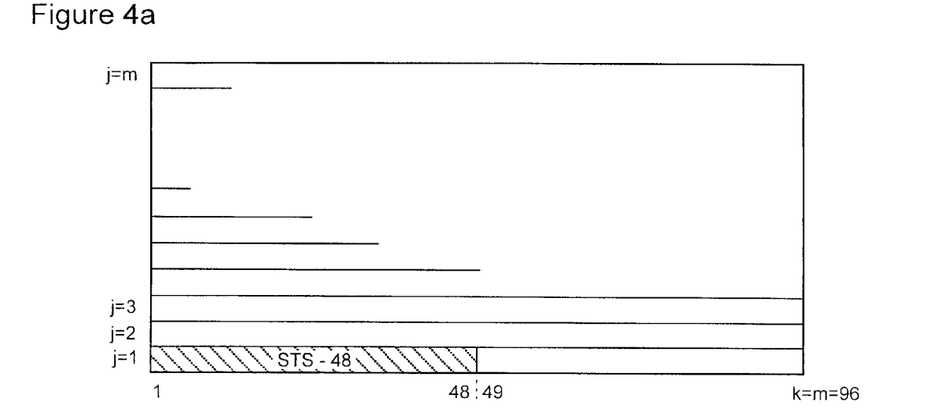
FIGS. 4a–4c illustrate respective loading patterns of signals layered in the connection matrix of FIG. 2 in accordance with the layering algorithm of FIG. 3.

FIG. 4a illustrates the layering pattern produced by mapping the STS-48 connection to the connection matrix 22 in the manner described above. Thus, each signal unit (STS-1 frame) of the STS-48 signal is mapped to respective I/O connections 20 in row 1 of the connection matrix 22, starting at column k=1 and progressing through to column k=48. As explained above, each column k of the connection matrix 22 is associated with a respective one of the center stage nodes 16. Thus, each signal unit (STS-1 frame) of the STS-48 signal is conveyed through the Clos network 2 to the egress node EN 18n via center stage nodes 16(k=1) through 16(k=48). Because each signal unit of the SONET signal is mapped to a respective I/O connection (and an associated center stage node 16) in a predefined order, the ingress node 14a can pointer-process the incoming STS-48 signal stream of the connection such that each signal unit (frame) of the signal is identified and routed to a corresponding respective I/O connection C(j,k) of the connection matrix 22. Similarly, the egress node EN 18n can readily pointer process the signal units (frames) received through each corresponding connection from the respective center stage nodes 16(1–48), to reassemble the original STS-48 signal for transmission through an output channel as a contiguous STS-48 signal.

As shown in FIG. 4a, the STS-48 signal is mapped into columns k=1 through k=48 of row j=1 of the connection matrix 22. This leaves 48 I/O connections 20 (i.e. columns 49 through 96) in row 1 that are unused. In general, these unused I/O connections 20 represented by the spaces in row 1 can be dealt with in one of three ways. One option is to leave these unused I/O connections empty (or filled with null frames) and begin mapping the next SONET connection into column k=1 of row j=2 of the connection matrix 22. While this approach simplifies signal switching, it can also be expected to result in a significant amount of unutilized capacity in the network 2, and it is therefore inefficient. A second option is to complete a row using only other connections destined to the same egress node, as will be explained below in more detail. A third option is to map a next successive SONET connection into available I/O connections that start at the first available I/O connection and, if necessary, wrap onto the next successive row (i.e. row 2) of the connection matrix 22, regardless of the egress node associated with the connection. In principle, this option can be expected to yield very high utilization of I/O connections within the connection matrix, thereby yielding a high efficiency of utilization of the Clos network 2. Furthermore, data traffic through the Clos network 2 is approximately evenly distributed across all of the center stage nodes 16.

It is possible to map the second SONET connection to the connection matrix 22, starting at connection C(1,49), even if the second signal is to be mapped to a different egress node 18 from that of the first mapped SONET connection. However, the amount of mapping overhead, as well as the number of control lines between the controller unit 10 and the center stage 8, can be reduced by a restricting use of the I/O connections 20 represented by any one row j of the connection matrix 22 to a common egress node 18. The association between any one row j of the connection matrix 22 and any respective egress node 18 is arbitrary and may be accomplished by provisioning, but is preferably made dynamically as successive SONET connections are mapped to the connection matrix 22. In the algorithm illustrated in FIG. 3, all three options may be supported. The three options are supported by defining rules that govern how the I/O connection availability decision is made in step 114 (FIG. 3). To enforce the first option of one connection layered across each row of the connection matrix, a rule is applied that defines all unused I/O connections 20 in the row as unavailable after a first signal is mapped to the row. To enforce the second option, a rule is applied that defines all unused I/O connections in a row as unavailable unless the egress node (EN) is the same as the egress node associated with other connection(s) mapped to the row. Enforcement of the third option only requires the application of a rule that in use I/O connections 20 are unavailable. Preferably, the controller 10 applies the same rules across the entire Clos network 2.

Returning to the previous example, the second SONET connection to be mapped to the connection matrix has a concatenated signal. As described above, the algorithm for layering this SONET connection starts with determination of the number of signal units N (=96) (step 102). The row and column counters j and k are then initialized (both to a value of 1) and the available connections counter AC initialized to zero (steps 106–110). A first I/O connection C(j,k) is then selected (step 112) and checked for availability (step 114).

As mentioned previously, the availability state of an I/O connection C(j,k) is a function of whether a segment of a previous SONET connection has been mapped to that I/O connection, and whether the selected I/O connection can be mapped through the respective center stage node to the egress node 18. In the present instance the first selected connection C(j=1,k=1) already has a segment mapped to it (signal unit S(a=1) of the STS-48 connection) and it is therefore not available. Thus the available connections counter AC is re-set to zero, at step 116. The value of the column counter k is then compared to M (step 126) to determine whether the selected connection C(j,k) is in the last column k=M of the connection matrix 22. If the result of this determination is "No", the column counter k is incremented (step 128) and the algorithm loops back to step 112 to select the next I/O connection.

Steps 112 through 128 are repeated for each successive I/O connection C(j,k) in columns 1 through 48 of row 1, with each connection C(j,k) being determined to be unavailable (step 114). Following reset of the available connections counter AC to zero (step 116) and comparison of the column counter k to the value of M (step 126), the value of the column counter k is incremented (step 128). When the value of the column counter k reaches 49, the corresponding I/O connection C(j=1,k=49) will be selected (step 112) and checked for availability at step 114. The availability check (step 114) determines that no previous segments have been mapped to this connection. If the rules governing I/O connection availability, as explained above, permit the selected I/O connection C(1,49) to be mapped through the center stage to the selected egress node for the STS-96 signal, then the selected I/O connection C(1,49) will be deemed to be in an available state.

For the purposes of the present example, it will be assumed that the rules permit the STS-96 signal to be mapped to the same row as the previously mapped STS-48 signal. Consequently, if the selected connection C(1,49) can be mapped to the egress node, the I/O connection will be determined to be available (at step 114). The available connections counter AC is therefore incremented by 1 (step 118), and since this I/O connection is the first found available connection (i.e., the value of the available connections counter AC=1—step 120) its location within the connection matrix 22 is stored at step 122. The value of the available connections counter AC is then compared to the number of signal units (N=96) at step 124 to determine whether enough available I/O connections have been identified to permit mapping of the STS-96 signal through the Clos network 2. If not, the column counter k is compared to M (step 126) to determine whether or not the selected connection is located in the last column k=M of the connection matrix 22. If not, the column counter k is incremented (step 128) before the algorithm loops back to step 112 for the selection of the next connection.

Steps 112 through 128 are repeated as described above for each successive I/O connection lying in columns k=50 through k=96, with each successive I/O connection being selected (step 112) and determined to be available (step 114); the available connections counter AC is incremented (step 118) and subsequently determined to be less than the bandwidth of the STS-96 connection (step 124). The value of the column counter k is compared to M (step 126) to determine whether the selected connection is in the last column of the connection matrix. When the value of the column counter k=M (=96), the algorithm proceeds to determine whether the currently selected connection is in the last row j=m of the connection matrix 22 (step 130). If the value of j is less than m, the row counter j is incremented by 1 (step 132) and the column counter k is reset to 1 (step 134) so that the next selected I/O connection is in column 1 of the next successive row. The algorithm then returns to step 112 for selection of the next I/O connection, C(j=2,k=1), which is thereafter checked for availability (step 114).

If the value of j is equal to m (step 130), then the selected I/O connection C(j,k) is located at j=m,k=M (that is, at the last connection) in the connection matrix 22. If this condition occurs and the value of the available connections counter AC is less than N (previously determined at step 124), it is confirmed that insufficient space is available to accommodate the high bandwidth connection. Accordingly, a blocking condition is reported at step 136, and the layering algorithm terminates.

In the present example, the connection matrix 22 was empty prior to mapping of the first STS-48 connection, and therefore rows j=2 through j=m of the connection matrix 22 are empty following mapping of the first connection. Therefore, each successive I/O connection C(j,k) within row j=2 of the connection matrix 22 is determined to be available, and steps 112 through 128 are repeated within row 2 of the connection matrix 22 until the value of the available connections counter AC equals N (=96) at step 124. The algorithm thereafter proceeds with mapping of the STS-96 connection in the manner described above with respect to the first STS-48 connection. Thus, the row and column counters j and k will be reset to the previously stored location of the first identified available connection C(j=1, k=49) at step 138. The frame counter (a) is initialized to 1 (step 140) and the first identified available I/O connection is selected (step 142). The signal unit S(a) identified by the frame counter (a) will then be mapped to the selected I/O connection C(j,k) and the connection mapped through the center stage node to the egress node 18n. The value of the frame counter (a) is compared to the value of N (step 148) to determine whether the last segment of the SONET connection has been mapped. If so, the successful mapping of the SONET connection is reported (step 150) and the algorithm terminates. Otherwise, the column counter k is compared with M to determine whether the selected connection is in the last column k=M of the connection matrix 22 (step 152). If it is, the values of the signal unit counters (a) and row counter j are incremented (step 154) and the column counter k is reset to 1 (step 156) before the algorithm loops back to step 142 for selection of the next connection. Otherwise, the value of the frame counter (a) and column counter (k) are incremented (step 158) before the algorithm loops back to step 142. Steps 142 through 158 are repeated until the entire STS-96 signal has been mapped to the 96 available I/O connections.

Figure 4B:
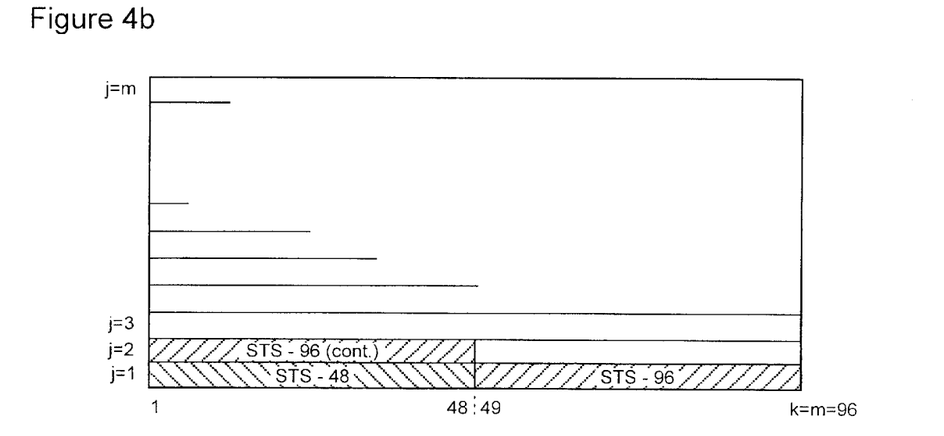

Following the mapping of the STS-96 signal as described above, the pattern of loading within the connection matrix 22 will be as illustrated in FIG. 4b. Thus, the first signal is mapped into columns k=1 through k=48 of row j=1 of the connection matrix 22, as illustrated in FIG. 4a. Because the second STS-96 connection shares a common egress node 18n with the first STS-48 connection (or in embodiments in which the availability rules permit I/O connections C(j,k) of a given row j of the connection matrix 22 to be mapped through the center stage 6 different egress nodes 18) the second (STS-96) signal is mapped to the connection matrix 22 starting in column k=49 of row j=1. Because the second connection requires more bandwidth (N=96) than can be accommodated by the 48 I/O connections within row 1 that remain unmapped after the mapping of the first connection, the second connection is mapped to successive connections C(j,k) in columns k=49 through k=96 of row j=1 and then wraps to successive connections C(j,k) n columns k=1 through k=48 of row j=2.

Figure 4C:
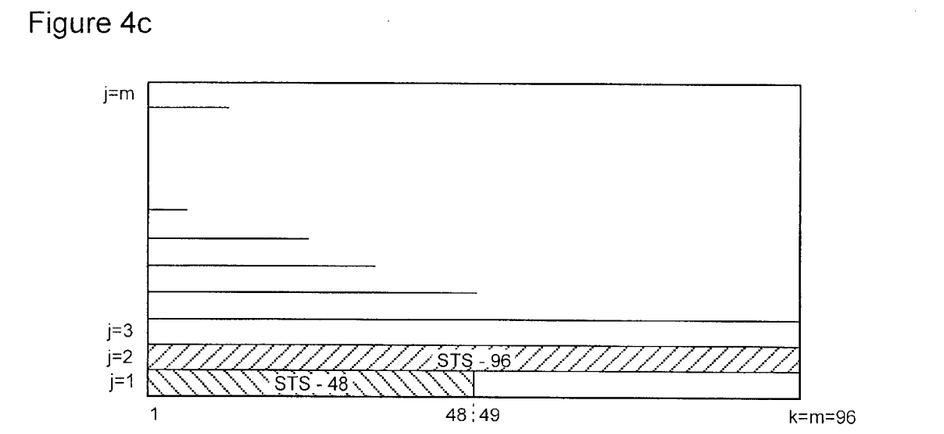

FIG. 4c illustrates the layering pattern produced in a case where the second SONET connection required mapping to a different egress node 18 from that of the first (STS-48) connection, due to availability rules related to the first or second options described above being applied. In this case, the I/O connections C(j,k) in columns k=49 through k=96 of row j=1 would not have been determined to be available (at step 114), for example, because those I/O connections could not be mapped to the egress node 18 of the second (STS-96) connection by virtue of the fact that the rules governing I/O connection availability restrict availability to the egress node 18n. In this case, processing through the steps 112 through 136 of the layering algorithm of FIG. 3 would have resulted in the first found available connection C(x,y) being identified in column k=1 of row j=2. Thus the STS-96 signal is mapped into successive connections C(j,k) in columns k=1 through k=96 of row j=2.

As discussed above, the unused connections in columns k=49 through k=96 of row j=1 can be either left unused or made available for mapping of a successive signal destined for the same egress node as the first mapped STS-48 signal occupying I/O connections C(j,k) lying in columns k=1 through k=48 of row j=1. If such a (third) connection request is received, steps 112 through 136 of the layering algorithm (FIG. 3) identify the I/O connections lying in columns k=49 through k=96 of row j=1 to be available for mapping of the third SONET connection. If the signal bandwidth N is less than or equal to the number of available connections in row j=1 (i.e. N≦48) then the value of the available connections counter AC will be found to equal N (at step 124) before the column counter k is compared to M (at step 126) and an attempt to select and check an I/O connection C(j,k) on row j=2 for availability will not be made. The algorithm will then proceed through steps 138 through 158 to map the third signal into the available I/O connections within row j=1, starting in column k=49, before reporting successful mapping of the signal (step 150) and terminating.

On the other hand, if the bandwidth of the signal exceeds the number of available connections within row j=1 (i.e. N>48), then processing of steps 112 through 136 of FIG. 3 will result in the I/O connection C(2,1) being selected and checked for availability at step 114. In this case, the selected connection will be found to be unavailable because a signal unit of the second (STS-96) connection was already mapped to this connection, and the available connections counter AC will be reset to zero(from AC=48) at step 116. The value of the column counter k will then be checked against M (step 126) and subsequently incremented (step 128) before the algorithm loops back to step 112 for selection of the next I/O connection C(j,k). Steps 112 through 128 will then be repeated as described above until an available connection is located. Because the third SONET connection shares a common egress node 18n with the first (STS-48) connection (and is different from that of the second connection), it follows that the first I/O connection C(k,j) which will be found to be available will be located in column k=1 of row j=3 of the connection matrix 22. Processing continues as described above to identify available I/O connections and subsequently map the third SONET connection into row j=3 of the connection matrix 22.

As shown in FIGS. 4a through 4c, successive SONET connections are mapped in layers within the connection matrix 22. This layering of SONET connections enables a highly efficient utilization of resources within the switch and provides a comparatively even distribution of data traffic across the nodes of the center stage. FIGS. 4a through 4c also show that the connection map of at least one center stage node (i.e. the indicated by the signal mappings within the respective column k of the connection matrix 22) will normally be different from the connection map of at least one other center stage node.

Figure 5A:
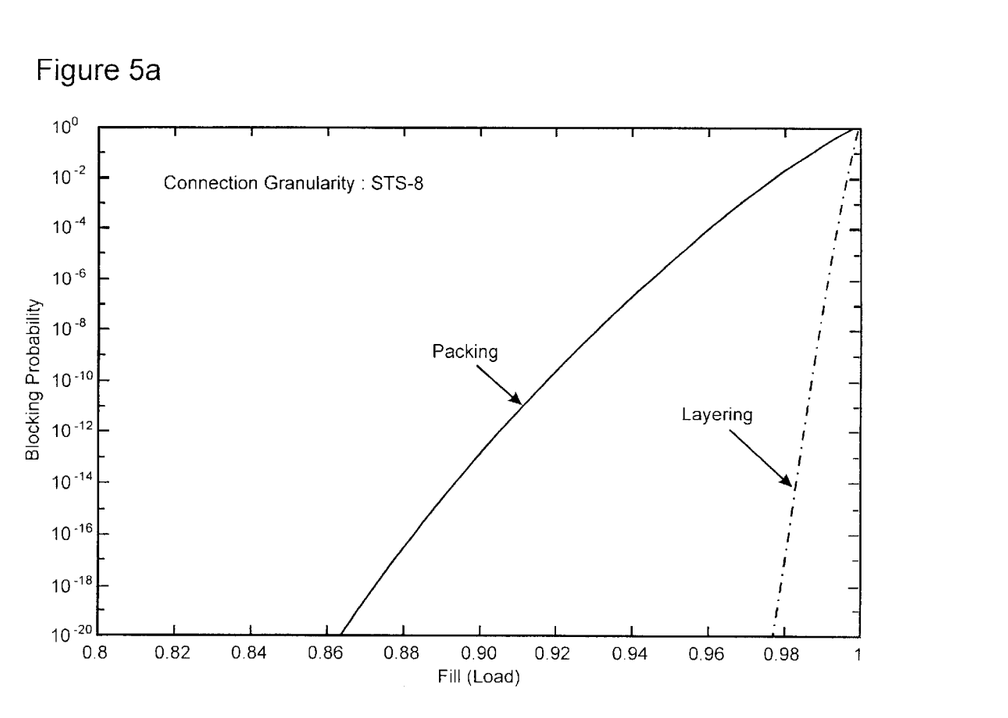
FIGS. 5a–5c are graphs comparing the theoretical probability of blocking of high bandwidth signals having respective different granularity, obtained using a prior art packing algorithm and a layering algorithm in accordance with the present invention.
Figure 5B:
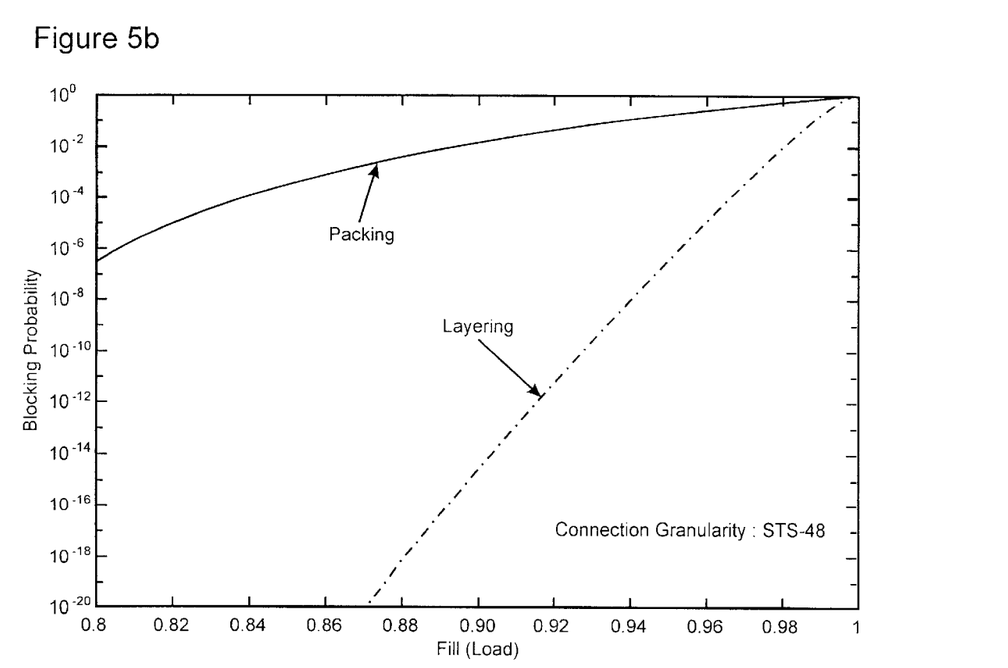
Figure 5C:
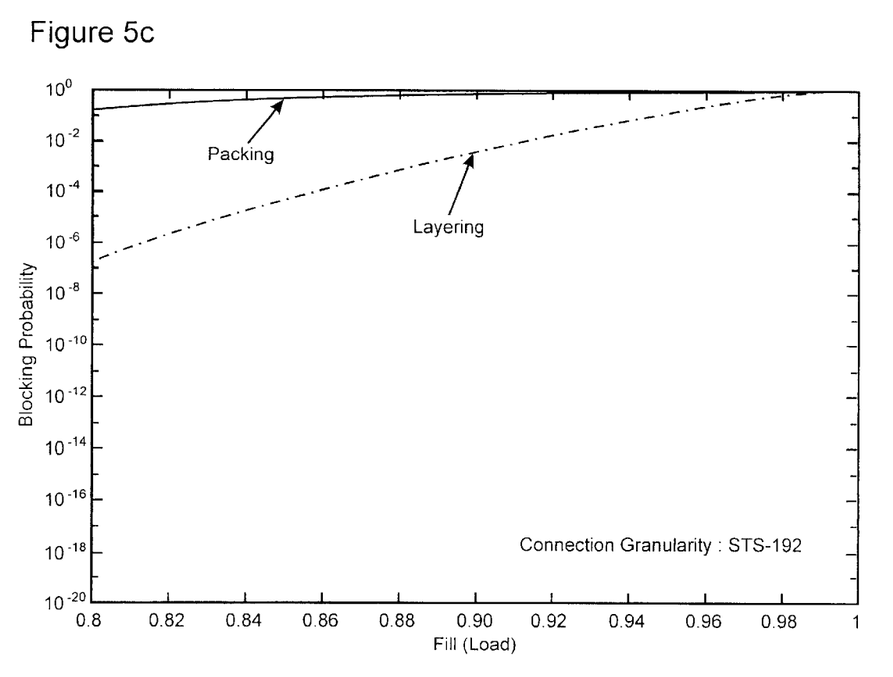

As shown in FIGS. 5a through 5c, these factors combine to result in a probability of blocking that is significantly lower than conventional packing techniques for any degree of fill (i.e. percentage of utilization) of the switch capacity. The results shown in FIGS. 5a–c were analytically derived and proven in simulation results. Assuming a connection is required between an idle input and an idle output of the Clos network 2 (FIG. 1), let P be the probability of blocking for a given I/O connection between the stages. Therefore:

the probability that a set of m I/O connections between any one node of the ingress stage to any one center stage node is blocked is $P^m$ for I/O connections of STS-1 granularity, hence $1-P^m$ is the probability that an I/O connection is idle; similarly, the probability that an I/O connection from the center stage to the egress stage is idle is $1-P^m$;

the probability that both I/O connections are idle is $(1-P^m)^2$, and, as a result, the probability that a given set of m I/O connections between ingress and egress stages is blocked is given by $1-(1-P^m)^2$:

for conventional packing methods there are $M-d_{packing}$ center stage nodes that can route from the same ingress node to the egress node; thus, the blocking probability is given by $(1-(1-P^m)^2)^{M-d}$; and for layering in accordance with the present invention, all of M center stage nodes are available; hence, the blocking probability is given by $(1-(1-P^m)^2)^M$.

In the case of packing $P=(M_p-d_{packing})/(M-d_{packing})$, where p is the traffic load on each ingress node. For general STS-k connections, the parameter m must be replaced with m/k. As a result, the probability that an STS-k signal will be blocked is given by:

$$P_{B(Packing)} = \left\{1 - \left[1 - \left(\frac{Mp - d_{packing}}{M - d_{packing}}\right)^{m/k}\right]^2\right\}^{M-d_{packing}}$$

In the case of layering, $P=(mp-d_{layering})/(m-d_{layering})$ Also, for STS-k connections, the parameter m is replaced with mM/k. As a result, the probability that an STS-k signal will be blocked is given by:

$$P_{B(Layering)} = \left\{1 - \left[1 - \left(\frac{mp - d_{layering}}{m - d_{layering}}\right)^{mM/k}\right]^2\right\}^M$$

FIGS. 5a, 5b and 5c compare the blocking probability $P_B$ of the layering algorithm of the present invention with a conventional packing algorithm for STS-8, STS-48 and STS-192 connections. In the numerical results, M=8 and m=40 have been assumed. Since $Md_{layering}=md_{packing}$ for the same number of connections, then $d_{packing}=6$ and $d_{layering}=30$ were selected.

The embodiment(s) of the invention described above is(are) intended to be exemplary only. The scope of the invention is therefore intended to be limited solely by the scope of the appended claims.

We claim:

1. A method of layering a connection for a high bandwidth signal through a Clos network between an ingress node and an egress node via a center stage comprising a plurality of center stage nodes, the method comprising steps of:

a) determining a number of units in the high bandwidth signal, each of the units having an equal predetermined size;

b) identifying a number of available contiguous connections through the Clos network equal to the number of units; and c) mapping each unit to a respective one of the identified available connections so that the units are distributed across the center stage nodes, in such a way that a connection map of at least one of the center stage nodes will normally be different from a connection map of at least one other of the center stage nodes of the Clos network.

2. A method as claimed in claim 1, wherein each node in the Clos network comprises Application Specific Integrated Circuits (ASICs).

3. A method as claimed in claim 1, wherein the high bandwidth signal is a SONET/SDH signal.

4. A method as claimed in claim 3, wherein the SONET/SDH signal is an STS-N signal comprising N STS-1 frames.

5. A method as claimed in claim 4, wherein the number of units of the high bandwidth signal corresponds with the number of frames in the STS-N signal.

6. A method as claimed in claim 4, wherein N is at least two.

7. A method as claimed in claim 1, wherein connections through the Clos network are represented by a connection matrix representing connections between the ingress node and the center stage nodes, each column of the matrix representing a link between the ingress node and a respective center stage node, and each row of the matrix representing connections between the ingress node and each of the center stage nodes, and wherein the step of identifying a number of available connections comprises steps of:

a) successively selecting each connection within a row of the connection matrix;

b) determining an availability of each selected connection;

c) incrementing a count of available connections when a selected connection is determined to be available;

d) resetting the count to zero when the selected connection is determined to be unavailable; and e) repeating steps a–d above until a first predetermined termination condition is satisfied.

8. A method as claimed in claim 7, wherein a connection is determined to be available if:

a) a unit of another high bandwidth signal has not previously been mapped to the connection; and b) the connection can be mapped through a center stage node on which the connection terminates, to the egress node.

9. A method as claimed in claim 7, further comprising a step of storing a location of a first available connection when the count of available connections is incremented to a value of one.

10. A method as claimed in claim 7, wherein the first predetermined termination condition comprises any one of:

a) the accumulated count of available connections is equal to the number of units; and b) a last connection within a row is selected and the accumulated count of available connections is less than the number of units.

11. A method as claimed in claim 10, wherein if a last connection within a row is selected and the accumulated count of available connections is less than the number of units, further comprising:

a) determining whether the matrix contains a next successive row; and b) if a next successive row exists, continuing the step of locating a number of available connections within the successive row.

12. A method as claimed in claim 11, wherein if a next successive row does not exist, further comprising a step of reporting a blocking condition of the high bandwidth signal.

13. A method as claimed in claim 1, wherein the step of mapping each unit of the high bandwidth signal comprises steps of:
   a) mapping each successive unit of the high bandwidth signal to a respective one of the identified available connections; and
   b) mapping each of the identified connections through a respective center stage node to the egress node.

14. A Clos network adapted to layer a connection for a high bandwidth signal between an ingress node and an egress node via a center stage having a plurality of center stage nodes, the Clos network comprising:
   a) means for determining a number of units in the high bandwidth signal, each of the units having an equal predetermined size;
   b) means for identifying a number of contiguous available connections through the Clos network equal to the number of units; and
   c) means for mapping each unit to a respective one of the identified available connections, so that the units are distributed across the center stage nodes, in such a way that a connection map of at least one of the center stage nodes will normally be different from a connection map of at least one other of the center stage nodes.

15. A Clos network as claimed in claim 14, wherein each node in the Clos network comprises an Application Specific Integrated Circuit (ASIC).

16. A Clos network as claimed in claim 14, wherein the size of each unit is greater than one bit.

17. A Clos network as claimed in claim 14, wherein the high bandwidth signal is a SONET/SDH signal.

18. A Clos network as claimed in claim 17, wherein the SONET/SDH signal is an STS-N signal comprising N STS-1 frames.

19. A Clos network as claimed in claim 18, wherein the number of units in the high bandwidth signal corresponds with the number of frames of the STS-N signal.

20. A Clos network as claimed in claim 19, wherein N is at least two.

21. A Clos network as claimed in claim 14, further comprising a matrix for representing connections between the ingress node and the center stage nodes, each column of the matrix representing a link between the ingress node and a respective one of the center stage nodes, and each row of the matrix representing connections between the ingress node and each of the center stage nodes.

22. A Clos network as claimed in claim 21, wherein the means for identifying a number of available connections comprises:
   a) means for successively selecting each connection within a row of the connection matrix;
   b) means for determining an availability of each selected connection;
   c) means for incrementing a count of available connections when a selected connection is determined to be available;
   d) means for resetting the count to zero when the selected connection is determined to be unavailable; and
   e) control means responsive to a predetermined termination condition for terminating operation of the locating means.

23. A Clos network as claimed in claim 22, wherein a connection is determined to be available if:
   a) a unit of another high bandwidth signal has not previously been mapped to the connection; and
   b) the connection can be mapped through a respective center stage node to the egress node.

24. A Clos network as claimed in claim 22, further comprising a means for storing a location of a first available connection when the count of available connections is incremented to a value of one.

25. A Clos network as claimed in claim 22, wherein the predetermined termination condition comprises any one of:
   a) the accumulated count of available connections being equal to the number of units; and
   b) a last connection within a row is selected and the accumulated count of available connections is less than the number of units.

26. A Clos network as claimed in claim 25, wherein, when a last connection within a row is selected and the accumulated count of available connections is less than the number of units, the control means is adapted to:
   a) determine whether the matrix contains a next successive row; and
   b) if a next successive row exists, continue the operation of the locating means within the next successive row.

27. A Clos network as claimed in claim 26, wherein, if a next successive row does not exist, the control means is adapted to report a blocking condition of the high bandwidth signal.

28. A Clos network as claimed in claim 14, wherein the means for mapping each unit of the high bandwidth signal comprises steps of:
   a) means for mapping each successive unit of the high bandwidth signal to a respective one of the identified available connections; and
   b) means for mapping each identified available connection through a respective center stage node to the egress node.

* * * * *